US008190572B2

(12) United States Patent
Anguelov

(10) Patent No.: US 8,190,572 B2
(45) Date of Patent: May 29, 2012

(54) HIGH-AVAILABILITY AND DATA PROTECTION OF OLTP DATABASES

(75) Inventor: Trifon M. Anguelov, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 705 days.

(21) Appl. No.: 11/675,368

(22) Filed: Feb. 15, 2007

(65) Prior Publication Data
US 2008/0201390 A1 Aug. 21, 2008

(51) Int. Cl.
G06F 7/00 (2006.01)
(52) U.S. Cl. ........................................................ 707/640
(58) Field of Classification Search .................. 707/204, 707/640, 648, 649
See application file for complete search history.

(56) References Cited

U.S. PATENT DOCUMENTS

| 6,877,016 B1* | 4/2005 | Hart et al. .............................. 1/1 |
| 6,957,221 B1* | 10/2005 | Hart et al. .............................. 1/1 |
| 2002/0049776 A1* | 4/2002 | Aronoff et al. ............... 707/200 |
| 2003/0037029 A1* | 2/2003 | Holenstein et al. ................ 707/1 |
| 2003/0182325 A1* | 9/2003 | Manley et al. ................. 707/204 |
| 2003/0182326 A1* | 9/2003 | Patterson ....................... 707/204 |
| 2004/0158549 A1* | 8/2004 | Matena et al. .................... 707/1 |
| 2005/0138461 A1* | 6/2005 | Allen et al. ........................ 714/4 |

OTHER PUBLICATIONS

Lee et al., "Technical Report : Cloning Oracle® E-Business Suite Using SnapMirror®", Jan. 15, 2004, Downloaded from http://www.netapp.com/library/tr/3300.pdf, Feb. 15, 2007.
Network Appliance Inc., "Network Appliance™ Technology Deployment At Oracle: Making Complex Storage Environments Simpler to Manage with a Low TCO", Aug. 2004, Downloaded from http://www.netapp.com/library/tr/3330.pdf, Feb. 15, 2007.
Network Appliance Inc., "Network Appliance™ Snapmirror® Software", (c) 2006, Downloaded from http://www.netapp.com/ftp/snapmirror.pdf, Feb. 15, 2007.

* cited by examiner

Primary Examiner — Jensen Hu
(74) Attorney, Agent, or Firm — Weaver Austin Villeneuve and Sampson LLP

(57) ABSTRACT

A method is for use with a primary online transactional processing (OLTP) database, to maintain a secondary storage usable by a backup OLTP database, wherein the primary storage, of the primary OLTP database, includes data files. In accordance with the method, as transaction indications for the primary OLTP database are recorded in at least one transaction log file, in the primary storage of the primary OLTP database, the transaction indications are caused to be mirrored to the secondary storage. At the file system level of the storage of the primary OLTP database and of the secondary storage, a state of data files of the primary OLTP database is occasionally caused to be duplicated from the primary storage to the secondary storage.

12 Claims, 3 Drawing Sheets

HIGH-AVAILABILITY AND DATA PROTECTION OF OLTP DATABASES

BACKGROUND

An online transactional processing (OLTP) database is a repository of transactional data of an enterprise, typically used by the enterprise to store transactional data in real time. An underlying implementation of an OLTP database may be, for example, a commercially available relational database, such as provided by Oracle Corporation.

Given the importance of transactions to a business, it is desirable that no transactions be "lost." For example, an OLTP database may be used to track customer support issues for an enterprise (e.g., e-mailed customer support inquiries), and it is desirable that none of the customer support issues be lost. In some environments, a backup of the files of an OLTP database may be maintained. However, this backup is typically stored on a storage medium such as a tape and, in the event of a failure of the OLTP database, the downtime to restore the database from the tape can be unacceptably long. In addition, transactions that were received after the backup was created (including those received while the OLTP database is being restored from the backup) will not be present on the backup storage medium and, thus, will not be present in the restored OLTP database.

SUMMARY

In accordance with an aspect, a method is for use with a primary online transactional processing (OLTP) database, to maintain a secondary storage usable by a backup OLTP database, wherein the primary storage, of the primary OLTP database, includes data files. In accordance with the method, as transaction indications for the primary OLTP database are recorded in at least one transaction log file, in the primary storage of the primary OLTP database, the transaction indications are caused to be mirrored to the secondary storage. At the file system level of the storage of the primary OLTP database and of the secondary storage, a state of data files of the primary OLTP database is occasionally caused to be duplicated from the primary storage to the secondary storage.

DETAILED DESCRIPTION

The inventors have realized that it is desirable for OLTP database transactions to continue to be stored in the event primary storage of the OLTP database fails. In addition, it is desirable that secondary (backup) storage be entirely current in the event primary storage of the OLTP database fails.

In accordance with a broad aspect, synchronization of primary storage of an OLTP database with secondary storage of the OLTP database is accomplished by mirroring control files of the database to the secondary storage from which, in the short term, the backup OLTP database can be expediently brought into synchronization with the primary OLTP database. The data itself of the primary OLTP database is occasionally synchronized to the secondary storage. A backup OLTP database, using the secondary storage, may be used in place of the primary OLTP database without loss of transactions. Thus, for example, the backup OLTP database may be "brought current" at any time and operate in place of the primary OLTP database.

Figure 1:
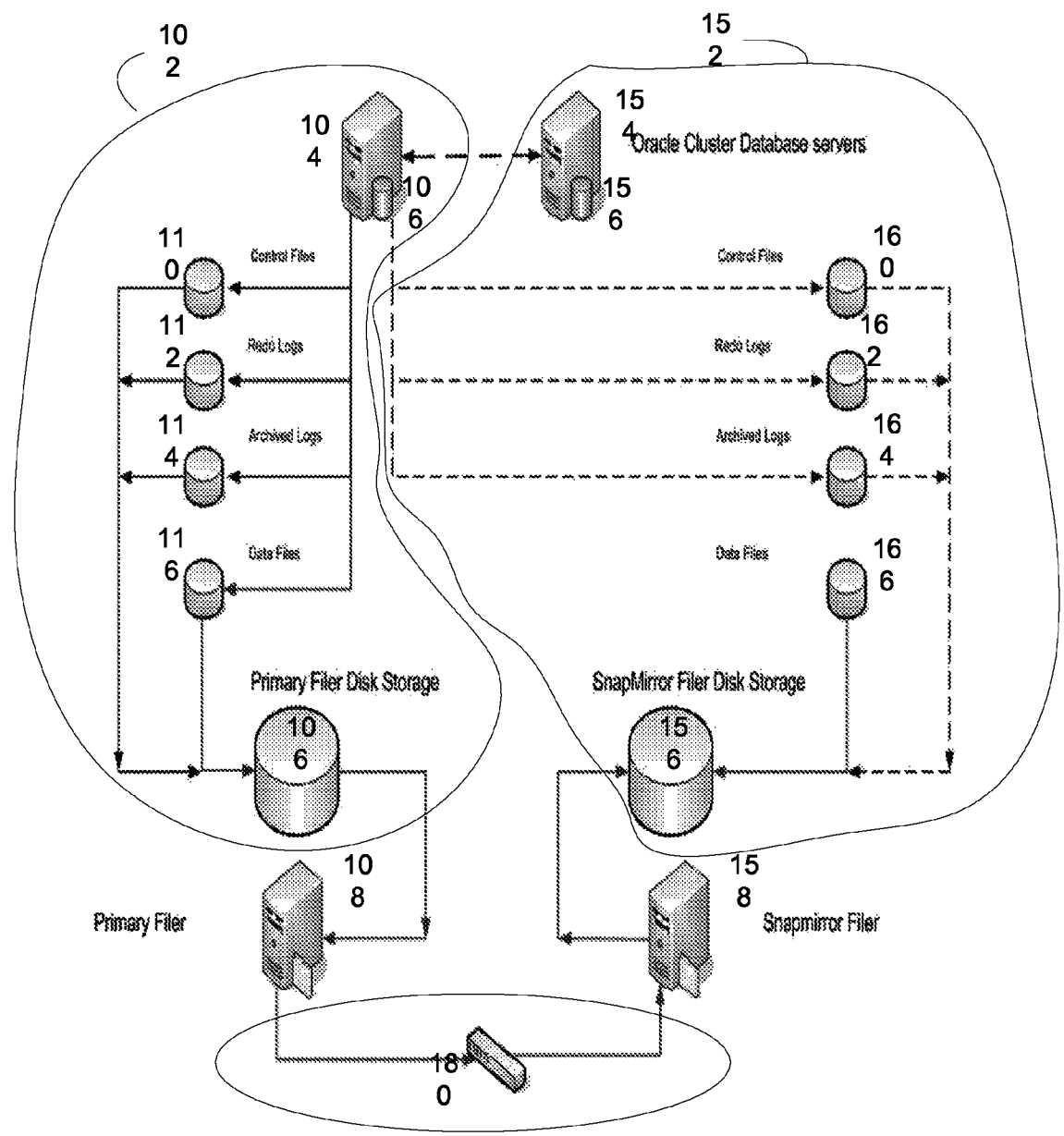
FIG. 1 is a block diagram illustrating an example system to accomplish synchronization of a primary OLTP database to a backup OLTP database.

FIG. 1 is a block diagram illustrating an example system 100 to accomplish synchronization of a primary OLTP database 102 to secondary storage for use when desired or required by a backup OLTP database 152. In the FIG. 1 example, the primary OLTP database 102 and the target OLTP database 152 are each implemented by an Oracle relational database, although the OLTP databases 102 and 152 may be implemented by other types of databases.

Referring to FIG. 1, the primary OLTP database 102 includes a database server 104 interoperating with database storage 106 implemented by an underlying file system 108. The database storage 106 holds transactional data files including control files 110, redo logs 112 and archived logs 114. The database storage also includes data files 116. The data files 116 include the underlying data stored in the primary OLTP database 102.

The control files 110, redo logs 112 and archived logs 114 include transactional information used and usable in the operation and maintenance of the primary OLTP database 102. That is, the control files 110 are the "brains" of the database, and include information to make the database operate. The redo logs 112 are used to record transactions against the data files 116. For example, if for some reason a transaction is not properly applied to a data file, then the redo logs 112 can be used to construct the proper state of the data files 116. The archived logs 114 include redo logs 112 that have been flushed to the archive.

The backup OLTP database 152 may be similar to the primary OLTP database 102. In the FIG. 1 example, the backup OLTP database 152 includes a database server 154 interoperating with secondary database storage 156 implemented by an underlying file system 158. The secondary database storage 156 holds control files 160, redo logs 162, archived logs 164 and data files 166. The data files 166 include the underlying data stored in the target data warehouse 152, and the control files 160, redo logs 162 and archived logs 164 include metadata used in the operation and maintenance of the target data warehouse 152.

Still referring to FIG. 1, the system 100 includes a filer synchronizer 180 configured to, at a file system level, take a "snapshot" of the database storage 106 and of the secondary database storage 156. The filer synchronizer 180 is further configured to compare the snapshots and transfer block changes from the database storage 106 to the secondary database storage 156. The filer synchronizer 180 may be, for example, implemented by "Snapshot," "SnapRestore" and "SnapMirror" products provided by Network Appliance, of Sunnyvale, Calif.

In accordance with one example, in one configuration, the file synchronizer 180 is configured to occasionally synchronize the data files 116 of the primary OLTP database 102 with the data files 166 of the secondary data storage 156, for use by the backup OLTP database 152. For example, the system may be configured such that the file synchronizer 180 synchronizes the data files 116 of the primary OLTP database 102 with the data files 166 of the secondary data storage 156, for use by the backup OLTP database 152, three times per day.

The file synchronizer 180 is not configured to synchronize the control files 110, redo logs 112 and archived logs 114 of the primary OLTP database 102 with the control files 160, redo logs 162 and archived logs 164 of the secondary storage 156, for use by the backup OLTP database 152. Rather, the primary OLTP database 102 is configured such that, during operation of the primary OLTP database 102, as information is being stored into the control files 110, redo logs 112 and archived logs 114 of the primary OLTP database 102, such information is also being stored into the control files 160, redo logs 162 and archived logs 164 of the secondary storage 156, for use by the backup OLTP database 152. For example, for an Oracle database, mirroring functions provided by Oracle may be utilized. Notably, however, while the control files 110, redo logs 112 and archived logs 114 of the primary OLTP database 102 are mirrored to the secondary storage 156, for use by the backup OLTP database 152, the information in these files is not applied to the data files 166 of the secondary storage 156, for use by the backup OLTP database 152, as part of the mirroring operation.

In this way, the control files 160, redo logs 162 and archived logs 164 are always consistent with the control files 110, redo logs 112 and archive log files of the primary data storage 106. More specifically, if there is a need for the backup OLTP database 152 to operate from the secondary storage 156 then, to the extent the backup data files 166 may not be current (i.e., accounting for all transactions, including the most recent transaction), the control files 160, redo logs 162 and archived logs 164 may be utilized to bring the data files 166 current for use by the backup OLTP database 152 current based on the logged transactions.

For Oracle databases, Oracle provides functionality for bringing the data files of a database current based on logged transactions. For example, bringing the data files of a database current may include comparing a "last sequence number" of a transaction accounted for in the data files to sequence numbers of transactions indicated in control files, redo logs or archive logs, to determine whether there are later transactions than those already accounted for in the data files. In the event it is determined that there are such later unaccounted for transactions, these transactions are applied, thus bringing the data files of the database current.

Figure 2:
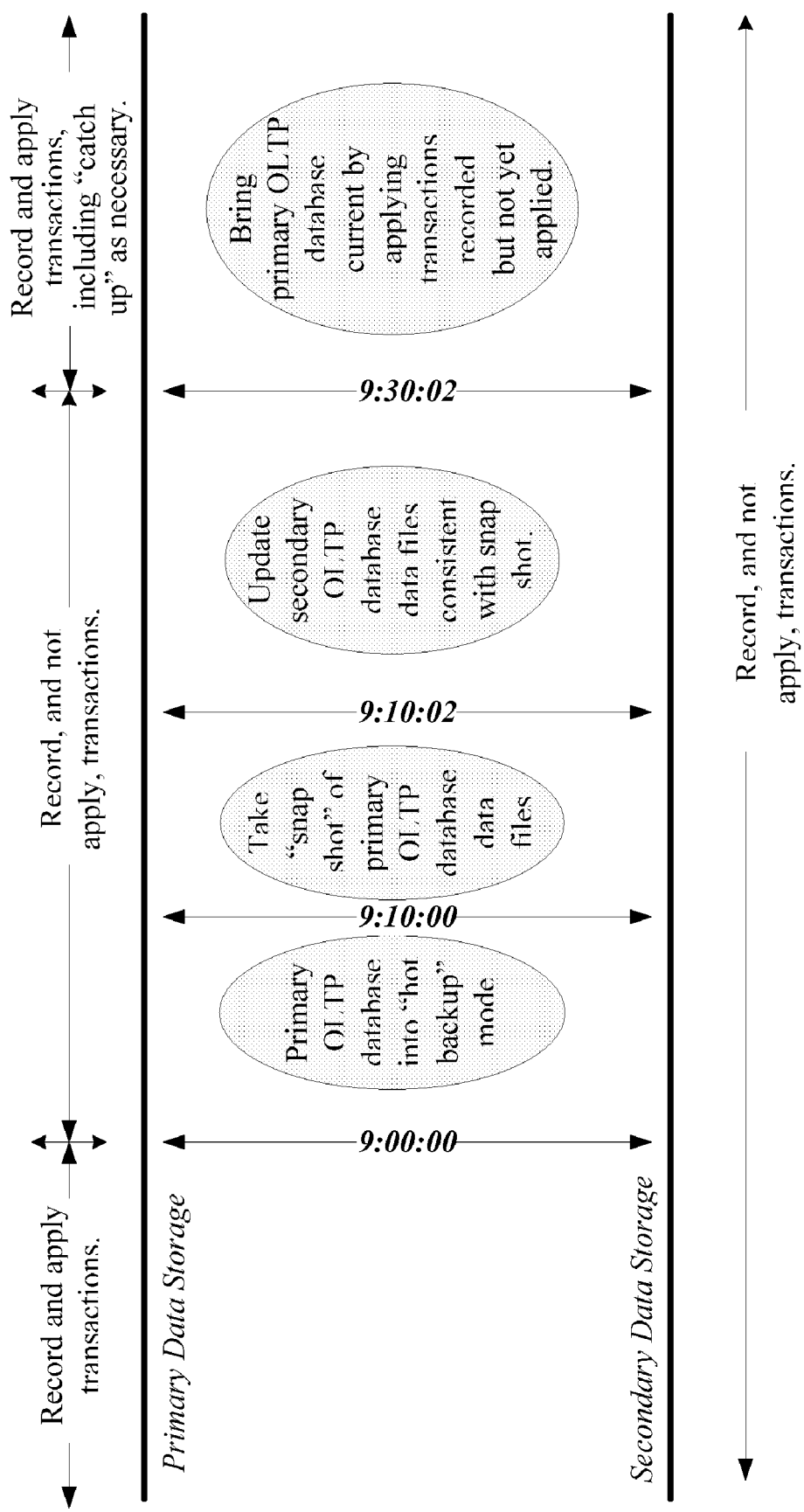
FIG. 2 illustrates an example timeline to illustrate an example of the interoperation (including synchronization) of primary and backup OLTP databases.

Having described an example system to accomplish synchronization of a primary OLTP database to secondary storage usable by a backup OLTP database, we now describe an example timeline to illustrate an example of the operation (including synchronization) of the primary OLTP database with regard to primary storage and secondary storage. FIG. 2 illustrates such a timeline. Referring to FIG. 2, in the example, the primary OLTP database is recording and applying transactions prior to 9:00:00 am. That is, the transactions are being recorded in the various control, redo log and archive log files and, in addition, the transactions are being applied to the data files of the primary storage associated with the primary OLTP database. With respect to the secondary storage usable by the backup OLTP database, prior to 9:00:00 am, the transactions are being recorded, by virtue of the mirroring operation, but there is no action with respect to the data files on the secondary storage.

At 9:00:00 am, a "hot backup" mode of the primary OLTP database is initiated, such that the data files of the primary storage are "locked." That is, the transactions continue to be recorded in the various control, redo log and archive log files of the primary storage, but the transactions are not applied to the data files of the primary storage. In addition, even after 9:00:00 am, the transaction mirroring operation continues, such that the transactions are being recorded to the various control, redo log and archive files of the secondary storage usable by the OLTP database. Thus, even during the backup processing, no transactions are lost.

From 9:10:00 am to 9:10:02 am, a "snap shot" is taken of the data files of the primary OLTP database. After 9:10:02 am, the snap shot taken of the data files of the primary OLTP database is compared to a snap shot of the data files of the secondary OLTP database (which may be, for example, taken at this time or may have been taken earlier). Based on the snap shot comparison, the data files of the secondary storage, usable by the OLTP database, are updated to be consistent with the snap shot of the data files of the primary OLTP database. For example, the underlying file systems of the primary and secondary data storage may operate based on blocks, where the "snap shots" identify characteristics of each block such that a snap shot comparison can be easily made to identify blocks that are different between the primary data storage and the secondary data storage.

At 9:30:02 am, the updating of the data files of the secondary OLTP database is complete and the primary OLTP database is taken out of "hot backup" mode. Thereafter, those transactions that have been recorded, but not yet applied, are then applied. The primary OLTP database resumes normal operation using the primary data storage, nominally recording transactions and mirroring the transactions to the secondary storage usable by the secondary OLTP database, as well as applying transactions to the data files of the primary OLTP database as the transactions are received. Some time later (e.g., one hour later or eight hours later), the process is repeated. This process may be, but need not be, performed on a regular basis.

In general, at any time, the secondary data storage includes all the information needed for the secondary OLTP database to take over operation from the primary OLTP database. When the secondary OLTP database takes over operation from the primary OLTP database, the secondary OLTP database simply applies, against the data files of the secondary storage, all transactions in the redo log file and/or archive log file that have not yet been applied to the data files in the secondary storage. The amount of time it will take to apply the as yet unapplied transactions may depend, at least in part, on the number of such transactions. The number of such transactions may depend, at least in part, on how long it has been since the data files of the secondary data storage have been updated from the primary data storage.

Figure 3:
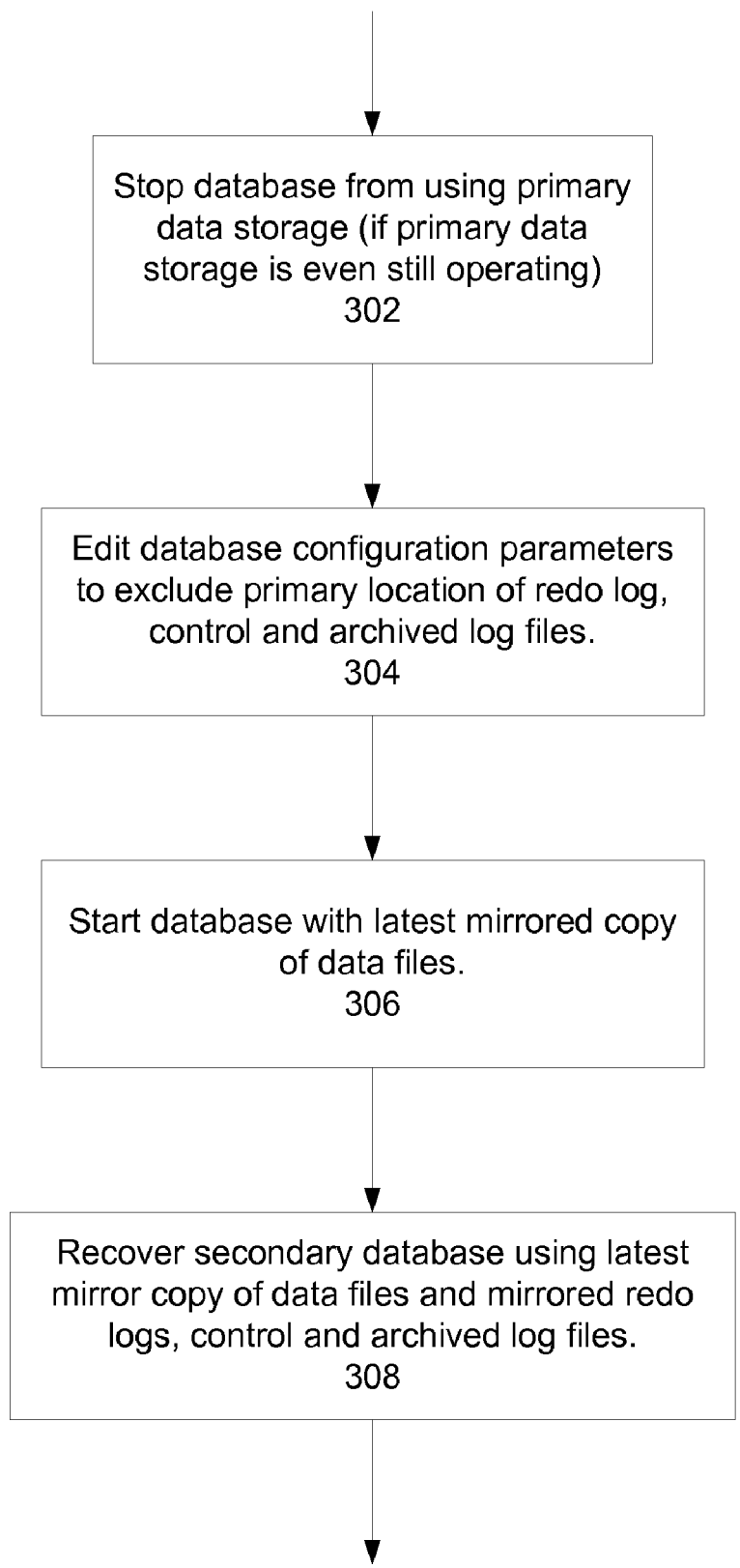
FIG. 3 is a flowchart illustrating a method to "fail over" an OLTP database to secondary storage from primary storage.

FIG. 3 is a flowchart illustrating an example of a method to "fail over" to the secondary data storage from the primary data storage. At step 302, the database is stopped from using the primary data storage, if the primary data storage is even still operating (e.g., the lack of operation of the primary data storage may have triggered the fail over). At step 304, the database configuration parameters are edited to exclude the primary data storage from being used for the redo log, control and archived log files. At step 306, the database is started with the latest mirrored copy of the data files, from the secondary storage. At step 308, as necessary and/or appropriate, the secondary database is recovered using the latest backed up copy of the data files in conjunction with the mirrored copies of the redo logs, control and archived log files.

It can thus be seen that the backup OLTP database may be used in place of the primary OLTP database, using the secondary storage, without loss of transactions and with minimal downtime during the transition. In particular, the backup OLTP database may be "brought current" at any time and operate in place of the primary OLTP database.

What is claimed is:

1. A method, for use with a primary online transactional processing (OLTP) database, to maintain a secondary storage usable by a backup OLTP database, wherein primary storage, of the primary OLTP database, is configured to interoperate with a first database server of the primary OLTP database, secondary storage of the backup OLTP database is configured to interoperate with a second database server of the backup OLTP database, and the primary storage includes data files of a file system underlying the primary OLTP database, the method comprising:

as transaction indications for the primary OLTP database are recorded in at least one transaction log file, in the primary storage of the primary OLTP database, causing the first database server to mirror the transaction indications to the secondary storage using mirroring functions provided by the first and second database servers;

at a file system level of the primary storage of the primary OLTP database and at a file system level of the secondary storage, occasionally causing changes identified in the data files of the primary OLTP database, including changes in the underlying data stored in the data files, to be copied from the primary storage to the secondary storage via a synchronizer configured to compare a snapshot of the data files of the primary OLTP database to a snapshot of data files of the backup OLTP database without reference to the transaction indications, and to transfer any changes in the data files of the primary OLTP database identified by the comparison from the primary storage to the secondary storage independently of the first database server, wherein further transaction indications continue to be mirrored to the secondary storage during the comparison of the snapshots and the transfer of the changes in the data files of the primary OLTP database, and wherein the further transaction indications are not applied to either the primary OLTP database or the backup OLTP database during the comparison of the snapshots and the transfer of the changes in the data files of the primary OLTP database; and applying the further transaction indications to the backup OLTP database after the transfer of the changes in the data files of the primary OLTP database.

2. The method of claim 1, wherein the secondary storage includes data files of a file system underlying the secondary OLTP database, the method further comprising:

applying the transaction indications, that have been mirrored to the secondary storage, to the data files of the secondary storage, whereby the data files of the secondary storage are brought current with the data files of the primary storage.

3. The method of claim 1, wherein:

occasionally causing changes identified in the data files to be copied from the primary storage to the secondary storage includes:

causing a snap shot of the data files on the primary storage to be compared with a snap shot of the data files on the secondary storage; and causing changes identified in data files to be copied from the primary storage to the secondary storage based on a result of the comparison.

4. The method of claim 1, wherein:

causing the first database server to mirror the transaction indications to the secondary storage includes using a standard mirror function of the OLTP database.

5. A system, for use with a primary online transactional processing (OLTP) database, to maintain a secondary storage usable by a backup OLTP database, wherein primary storage, of the primary OLTP database, is configured to interoperate with a first database server of the primary OLTP database, secondary storage of the backup OLTP database is configured to interoperate with a second database server of the backup OLTP database, and the primary storage includes data files of a file system underlying the primary OLTP database, the system including at least one computing device configured to:

as transaction indications for the primary OLTP database are recorded in at least one transaction log file, in the primary storage of the primary OLTP database, cause the first database server to mirror the transaction indications to the secondary storage using mirroring functions provided by the first and second database servers;

at a file system level of the primary storage of the primary OLTP database and at a file system level of the secondary storage, occasionally cause changes identified in the data files of the primary OLTP database, including changes in the underlying data stored in the data files, to be copied from the primary storage to the secondary storage via a synchronizer configured to compare a snapshot of the data files of the primary OLTP database to a snapshot of data files of the backup OLTP database without reference to the transaction indications, and to transfer any changes in the data files of the primary OLTP database identified by the comparison from the primary storage to the secondary storage independently of the first database server, wherein further transaction indications continue to be mirrored to the secondary storage during the comparison of the snapshots and the transfer of the changes in the data files of the primary OLTP database, and wherein the further transaction indications are not applied to either the primary OLTP database or the backup OLTP database during the comparison of the snapshots and the transfer of the changes in the data files of the primary OLTP database; and apply the further transaction indications to the backup OLTP database after the transfer of the changes in the data files of the primary OLTP database.

6. The system of claim 5, wherein the secondary storage includes data files of a file system underlying the secondary OLTP database, and the at least one computing device is further configured to:

apply the transaction indications, that have been mirrored to the secondary storage, to the data files of the secondary storage, whereby the data files of the secondary storage are brought current with the data files of the primary storage.

7. The system of claim 5, wherein:

the at least one computing device being configured to occasionally cause changes identified in the data files to be copied from the primary storage to the secondary storage includes the at least one computing device being configured to:

cause a snap shot of the data files on the primary storage to be compared with a snap shot of the data files on the secondary storage; and cause changes identified in the data files to be copied from the primary storage to the secondary storage based on a result of the comparison.

8. The system of claim 5, wherein:

the at least one computing device being configured to cause the first database server to mirror the transaction indications to the secondary storage includes the at least one computing device being configured to use a standard mirror function of the OLTP database.

9. A computer program product for use with a primary online transactional processing (OLTP) database, to maintain a secondary storage located at a backup OLTP database, wherein primary storage, of the primary OLTP database, is configured to interoperate with a first database server of the primary OLTP database, secondary storage of the backup OLTP database is configured to interoperate with a second database server of the backup OLTP database, and the primary storage includes data files of a file system underlying the primary OLTP database, the computer program product comprising at least one non-transitory computer-readable medium having computer program instructions stored therein which are operable to cause at least one computing device to:

as transaction indications for the primary OLTP database are recorded in at least one transaction log file, in the primary storage of the primary OLTP database, cause the first database server to mirror the transaction indications to the secondary storage using mirroring functions provided by the first and second database servers;

at a file system level of the primary storage of the primary OLTP database and at a file system level of the secondary storage, occasionally cause changes identified in the data files of the primary OLTP database, including changes in the underlying data stored in the data files, to be copied from the primary storage to the secondary storage via a synchronizer configured to compare a snapshot of the data files of the primary OLTP database to a snapshot of data files of the backup OLTP database without reference to the transaction indications, and to transfer any changes in the data files of the primary OLTP database identified by the comparison from the primary storage to the secondary storage independently of the first database server, wherein further transaction indications continue to be mirrored to the secondary storage during the comparison of the snapshots and the transfer of the changes in the data files of the primary OLTP database, and wherein the further transaction indications are not applied to either the primary OLTP database or the backup OLTP database during the comparison of the snapshots and the transfer of the changes in the data files of the primary OLTP database; and apply the further transaction indications to the backup OLTP database after the transfer of the changes in the data files of the primary OLTP database.

10. The computer program product of claim 9, wherein the secondary storage includes data files of a file system underlying the secondary OLTP database, and the computer program instructions are further operable to cause the at least one computing device to:

apply the transaction indications, that have been mirrored to the secondary storage, to the data files of the secondary storage, whereby the data files of the secondary storage are brought current with the data files of the primary storage.

11. The computer program product of claim 9, wherein:

the at least one computing device being configured to occasionally cause changes identified in the data files to be copied from the primary storage to the secondary storage includes the at least one computing device being configured to:

cause a snap shot of the data files on the primary storage to be compared with a snap shot of the data files on the secondary storage; and cause changes identified in data files to be copied from the primary storage to the secondary storage based on a result of the comparison.

12. The computer program product of claim 9, wherein:

the at least one computing device being configured to cause the first database server to mirror the transaction indications to the secondary storage includes the at least one computing device being configured to use a standard mirror function of the OLTP database.

* * * * *